UNITED STATES PATENT OFFICE.

CARL AUER VON WELSBACH, OF VIENNA, AUSTRIA-HUNGARY, ASSIGNOR TO THE WELSBACH INCANDESCENT GAS LIGHT COMPANY.

PROCESS OF OBTAINING SALTS OF CERIUM, &c.

SPECIFICATION forming part of Letters Patent No. 377,701, dated February 7, 1888.

Application filed February 23, 1887. Serial No. 228,597. (No specimens.) Patented in England July 29, 1886, No. 9,806.

*To all whom it may concern:*

Be it known that I, CARL AUER VON WELSBACH, a subject of the Emperor of Austria-Hungary, residing at Vienna, in the Empire of Austria-Hungary, have invented a new and useful method of obtaining compounds of the rarer metals from their earths for use as incandescent bodies for illuminating purposes, (for which I have obtained a patent in Great Britain dated July 29, 1886, No. 9,806,) of which the following is a specification.

This invention relates to the treatment of the earths of the rarer metals—such as minerals containing cerium, didymium, lanthanum, thorinum, and zirconium—in order to obtain therefrom solutions suitable for the production of incandescent bodies, such as are described in the specification of my United States Letters Patent dated March 15, 1887, No. 359,524.

In treating cerite, orthite, and other similar minerals containing cerium, didymium, and lanthanum, for obtaining these in a separated condition, the minerals are in the first instance heated to a red heat, with free admission of air in those cases in which iron is contained therein in the form of a protoxide, in order to oxidize the iron of the cerite compounds to a higher degree, and thus avoid various difficulties in the subsequent operations. This heating process is, however, only applicable when the percentage of cerium compounds is considerable, and when the mineral is a silicate and not fusible in ordinary temperatures. A number of such minerals comply with these conditions. In particular may be mentioned cerite, the treatment of which will now be described by way of example. The raw material as extracted from the earth is heated to a red heat, in lumps about the size of a fist, with free admission of air, for about an hour. The mineral is thereby changed in such manner that its original reddish-gray color has been converted into yellow and that it has taken up oxygen. The lumps while hot are plunged rapidly into water, whereby they crumble to pieces, thus greatly facilitating the following disintegrating process, in which the material is crushed partly to powder and partly into small particles of about the size of hemp-seed. The finer particles being separated from the coarser ones, both parts are stirred in suitable vessels, together with ordinary concentrated hydrochloric acid, whereby the finer particles become decomposed under evolution of heat while the coarser particles only become slightly heated. After some days the finer particles will be entirely decomposed, and if the proper proportion of acid has been used this will have become entirely exhausted. The decomposition of the coarser particles takes place more slowly, and is only completed in about a fortnight. It is advantageous to draw off the solution formed after a few days to levigate the sludge with water and to mix it with a fresh supply of concentrated hydrochloric acid until all particles susceptible of decomposition are decomposed, which can be ascertained by the fact that the original grains of cerite will have been converted into a friable skeleton mass of silicic acid. The chloride solution obtained by the above process is precipitated by means of oxalic acid, and the oxalates are washed by decantation and through a filter-cloth, and after being pressed dry they are heated to a red heat in shallow iron pans, but only to such an extent that no complete conversion into the oxides is effected. The brown oxides, containing a considerable amount of carbonic acid, should, on being treated in the cold with concentrated nitric acid, dissolve after a short time with ebullition to a dark-red liquid. Only when obtained in the above-described manner is the preparation suitable for the following separation process. The oxides are now stirred together with water in an acid-proof vessel and heated on a steam-bath, nitric acid being added in small quantities as long as a frothing is observed to take place after every addition.

As the composition of the minerals is very variable, even when taken from one and the same locality, the quantity of nitric acid cannot be fixed in advance.

The nitrate solution formed after the addition of the nitric acid is digested with excess of the earths. If after about ten hours digesting it is not converted into a very fine yellowish-red or yellowish powder, but remains of a brown color, nitric acid must again be added, and this process must be continued until the precipitate shows the above-mentioned color.

The supernatant liquid is then of an amethyst color, and the precipitate formed is insoluble even in very dilute solution.

If in carrying out the process so much nitric acid has been added that the yellowish-white precipitate is dissolved into a yellowish liquid on the addition of a large quantity of water, then too much acid has been added, and quantities of the earthy sludge, obtained as above described, mixed with water, must be added until the precipitate obtained has the above-mentioned properties. In this precipitate will be contained the whole of the cerium of the original mineral in the form of a compound insoluble in water, while the solution will contain all the other rare earths.

The cerium precipitate obtained after washing is readily soluble in nitric acid when heated, and the dark-red solution thus obtained is mainly cerium nitrate. The principal constituents of the lye will be the elements of didymium (praseodymium and neodymium) and lanthanum. For separating these from each other the solution separated from the precipitate is evaporated and treated with nitric acid and ammonium nitrate, and is separated into its constituents by the formation of the ammonium double nitrates.

In order to perfectly separate the lanthanum by means of frictional crystallization, the crystallizing process must be repeated several times.

The colorless crystals of lanthanum ammonium nitrate are chemically pure, and form as solution one of the principal ingredients of the liquid for producing the incandescent bodies.

Having thus described my invention, what I claim, and desire to secure by Letters Patent, is—

The herein-described method of obtaining compounds of the rarer metals—such as cerium, lanthanum, and didymium—by heating mineral earth containing them, plunging the heated earth in water, crushing, dissolving the fragments in a mineral acid and precipitating by oxalic acid, washing and filtering the precipitate, heating it and afterward dissolving it in nitric acid, digesting the solution with excess of the earth, separating into two parts a precipitate and a solution, dissolving the precipitate in nitric acid and so producing cerium nitrate, concentrating the solution and heating it with nitric acid and ammonium nitrate, then separating by fractional crystallization the ammonium double nitrates of lanthanum and of praseodymium and neodymium, substantially as described.

In testimony whereof I have signed my name to this specification, in the presence of two subscribing witnesses, this 13th day of January, A. D. 1887.

CARL AUER VON WELSBACH.

Witnesses:
EDWARD P. MacLEAN,
JOS. B. BOURNE.